United States Patent
Sugiura (10) Patent No.: US 7,558,675 B2
(45) Date of Patent: Jul. 7, 2009

(54) PROBABLISTIC IMAGING WITH AZIMUTHALLY SENSITIVE MWD/LWD SENSORS

(75) Inventor: Junichi Sugiura, Houston, TX (US)

(73) Assignee: Smith International, Inc., Houston, TX (US)

(*) Notice: Subject to any disclaimer, the term of this patent is extended or adjusted under 35 U.S.C. 154(b) by 37 days.

(21) Appl. No.: 11/881,043

(22) Filed: Jul. 25, 2007

(65) Prior Publication Data
US 2009/0030616 A1      Jan. 29, 2009

(51) Int. Cl.
*G06F 19/00* (2006.01)

(52) U.S. Cl. .............................. 702/9; 702/6

(58) Field of Classification Search ............. 73/152.14, 73/152.43; 175/41; 250/254, 269.3; 324/71.3, 324/333, 351, 356, 369; 702/8, 13, 6, 9
See application file for complete search history.

(56) References Cited

U.S. PATENT DOCUMENTS

| | | |
|---|---|---|
| 3,305,771 A | 2/1967 | Arps |
| 3,377,549 A | 4/1968 | Newman et al. |
| 3,408,561 A | 10/1968 | Redwine et al. |
| 3,488,574 A | 1/1970 | Tanguy |
| 4,468,623 A | 8/1984 | Gianzero et al. |
| 4,542,648 A | 9/1985 | Vinegar et al. |
| 4,562,556 A | 12/1985 | Ingram et al. |
| 4,642,648 A | 2/1987 | Hulland et al. |
| 4,652,829 A | 3/1987 | Safinya |
| 4,720,681 A | 1/1988 | Sinclair |
| 4,766,442 A | 8/1988 | Issenmann |
| 4,786,874 A | 11/1988 | Grosso et al. |
| 4,845,433 A | 7/1989 | Kleinberg et al. |
| 4,873,488 A | 10/1989 | Barber et al. |
| 4,940,943 A | 7/1990 | Bartel et al. |
| 5,023,450 A | 6/1991 | Gold |
| 5,045,795 A | 9/1991 | Gianzero et al. |
| 5,184,079 A | 2/1993 | Barber |

(Continued)

FOREIGN PATENT DOCUMENTS

EP      0793000      4/2001

(Continued)

OTHER PUBLICATIONS

Oppenheim, A. V. and Schafer, R.W., Digital Signal Processing, Prentice-Hall, 1975, pp. pp. 239-250 and pp. 548-554.

(Continued)

*Primary Examiner*—Edward R Cosimano
*Assistant Examiner*—Douglas N Washburn (57) ABSTRACT

A method for forming a borehole image of an azimuthally sensitive borehole or formation parameter is disclosed. Such a borehole image may be formed, for example, by processing logging sensor data with a predetermined sensor response function (also referred to herein as a probability density function) to acquire probabilistically distributed sensor data. The sensor data may be distributed in either one-dimension (azimuthal) or two-dimensions (azimuthal and axial). Certain embodiments of this invention may be advantageously utilized in LWD imaging applications and provide for superior image resolution and noise rejection as compared to prior art binning techniques. Exemplary embodiments of the invention also advantageously conserve logging sensor data such that integration of the distributed data over the entire circumference of the tool provides a non-azimuthally sensitive logging measurement.

29 Claims, 5 Drawing Sheets

U.S. PATENT DOCUMENTS

| | | | |
|---|---|---|---|
| 5,200,705 A | 4/1993 | Clark et al. | |
| 5,233,522 A | 8/1993 | Sinclair | |
| 5,235,285 A | 8/1993 | Clark et al. | |
| 5,260,662 A | 11/1993 | Rorden | |
| 5,291,137 A | 3/1994 | Freedman | |
| 5,331,331 A | 7/1994 | Wu | |
| 5,339,036 A | 8/1994 | Clark et al. | |
| 5,339,037 A | 8/1994 | Bonner et al. | |
| 5,357,797 A | 10/1994 | Maki, Jr. et al. | |
| 5,359,324 A | 10/1994 | Clark et al. | |
| 5,381,092 A | 1/1995 | Freedman | |
| 5,422,480 A | 6/1995 | Schultz | |
| 5,453,693 A | 9/1995 | Sinclair et al. | |
| 5,461,562 A | 10/1995 | Tabanou et al. | |
| 5,463,319 A | 10/1995 | Chesnutt et al. | |
| 5,463,320 A | 10/1995 | Bonner et al. | |
| 5,467,832 A | 11/1995 | Orban et al. | |
| 5,473,158 A | 12/1995 | Holenka et al. | |
| 5,486,695 A | 1/1996 | Schultz et al. | |
| 5,491,488 A | 2/1996 | Wu | |
| 5,506,769 A | 4/1996 | Fu et al. | |
| 5,513,528 A | 5/1996 | Holenka et al. | |
| 5,519,318 A | 5/1996 | Koerner et al. | |
| 5,519,668 A | 5/1996 | Montaron | |
| 5,530,358 A | 6/1996 | Wisler et al. | |
| 5,563,512 A | 10/1996 | Mumby | |
| 5,591,967 A | 1/1997 | Moake | |
| 5,661,402 A | 8/1997 | Chesnutt et al. | |
| 5,672,867 A | 9/1997 | Gadeken et al. | |
| 5,675,488 A | 10/1997 | McElhinney | |
| 5,680,906 A | 10/1997 | Andrieux et al. | |
| 5,850,624 A | 12/1998 | Gard et al. | |
| 5,867,806 A | 2/1999 | Strickland et al. | |
| 5,892,460 A | 4/1999 | Jerabek et al. | |
| 5,899,958 A | 5/1999 | Dowell et al. | |
| 5,953,683 A | 9/1999 | Hansen et al. | |
| 5,966,013 A | 10/1999 | Hagiwara | |
| 6,023,168 A | 2/2000 | Minerbo | |
| 6,023,658 A | 2/2000 | Jeffryes | |
| 6,037,776 A | 3/2000 | McGlone | |
| 6,064,210 A | 5/2000 | Sinclair | |
| 6,100,696 A | 8/2000 | Sinclair | |
| 6,131,694 A | 10/2000 | Robbins et al. | |
| 6,166,539 A | 12/2000 | Dahlberg et al. | |
| 6,167,348 A | 12/2000 | Cannon | |
| 6,173,793 B1 | 1/2001 | Thompson et al. | |
| 6,215,120 B1 | 4/2001 | Gadeken et al. | |
| 6,307,199 B1 | 10/2001 | Edwards et al. | |
| 6,321,456 B1 | 11/2001 | McElhinnney | |
| 6,326,784 B1 | 12/2001 | Ganesan et al. | |
| 6,406,136 B1 | 6/2002 | Fries et al. | |
| 6,446,736 B1 | 9/2002 | Kruspe et al. | |
| 6,509,738 B1 | 1/2003 | Minerbo et al. | |
| 6,510,105 B1 | 1/2003 | Ten Kroode et al. | |
| 6,510,106 B2 | 1/2003 | Hudson | |
| 6,564,883 B2 | 5/2003 | Fredericks et al. | |
| 6,584,837 B2 | 7/2003 | Kurkoski | |
| 6,619,395 B2 | 9/2003 | Spross | |
| 6,637,524 B2 | 10/2003 | Kruspe et al. | |
| 6,693,430 B2 | 2/2004 | Rosthal et al. | |
| 6,696,684 B2 | 2/2004 | Radtke et al. | |
| 6,704,436 B1 | 3/2004 | Anxionnaz et al. | |
| 6,710,601 B2 | 3/2004 | Rosthal et al. | |
| 6,714,014 B2 | 3/2004 | Evans et al. | |
| 6,715,550 B2 | 4/2004 | Vinegar et al. | |
| 6,717,404 B2 | 4/2004 | Prammer | |
| 6,724,192 B1 | 4/2004 | McGlone | |
| 6,747,569 B2 | 6/2004 | Hill et al. | |
| 6,758,277 B2 | 7/2004 | Vinegar et al. | |
| 6,768,957 B2 | 7/2004 | Kato | |
| 6,774,628 B2 | 8/2004 | Ganesan | |
| 6,816,788 B2 | 11/2004 | Van Steenwyk et al. | |
| 6,826,842 B2 | 12/2004 | Abe et al. | |
| 6,833,706 B2 | 12/2004 | Niina | |
| 6,843,318 B2 | 1/2005 | Yarbro | |
| 6,891,777 B2 | 5/2005 | Pabon et al. | |
| 6,944,548 B2 | 9/2005 | Radtke et al. | |
| 6,957,145 B2 | 10/2005 | Spross | |
| 7,027,926 B2 * | 4/2006 | Haugland | 702/9 |
| 7,103,982 B2 * | 9/2006 | Haugland | 33/304 |
| 7,143,521 B2 * | 12/2006 | Haugland | 33/304 |
| 7,403,857 B2 * | 7/2008 | Haugland | 702/6 |
| 2002/0062992 A1 | 5/2002 | Fredericks et al. | |
| 2002/0105332 A1 | 8/2002 | Rosthal et al. | |
| 2002/0108784 A1 | 8/2002 | Kruspe et al. | |
| 2003/0042016 A1 | 3/2003 | Vinegar et al. | |
| 2003/0048697 A1 | 3/2003 | Hirsch et al. | |
| 2003/0066671 A1 | 4/2003 | Vinegar et al. | |
| 2003/0146751 A1 | 8/2003 | Rosthal et al. | |
| 2003/0146753 A1 | 8/2003 | Rosthal et al. | |
| 2003/0155924 A1 | 8/2003 | Rosthal et al. | |
| 2003/0184299 A1 | 10/2003 | Strack | |
| 2003/0184303 A1 | 10/2003 | Homan et al. | |
| 2003/0227393 A1 | 12/2003 | Vinegar et al. | |
| 2004/0079524 A1 | 4/2004 | Bass et al. | |
| 2004/0079526 A1 | 4/2004 | Cairns et al. | |
| 2004/0089475 A1 | 5/2004 | Kruspe et al. | |
| 2004/0144530 A1 | 7/2004 | Bass et al. | |
| 2004/0222019 A1 | 11/2004 | Estes et al. | |
| 2005/0140373 A1 | 6/2005 | Li et al. | |
| 2005/0189947 A1 | 9/2005 | Haugland | |
| 2005/0234647 A1 | 10/2005 | Haugland | |
| 2006/0179627 A1 | 8/2006 | Sakai et al. | |

FOREIGN PATENT DOCUMENTS

| | | |
|---|---|---|
| GB | 2301438 | 4/1996 |
| GB | 2411729 A | 9/2005 |
| GB | 2415049 A | 12/2005 |
| GB | 2416038 A | 1/2006 |

OTHER PUBLICATIONS

Jan, Yih-Min and Harrell, John W., "MWD Directional-Focused Gamma Ray—A New Tool For Formation Evaluation And Drilling Control in Horizontal Wells," SPWLA Twenty-Eighth Annual Logging Symposium, Jun. 29-Jul. 2, 1987, Paper A.

* cited by examiner

PROBABLISTIC IMAGING WITH AZIMUTHALLY SENSITIVE MWD/LWD SENSORS

RELATED APPLICATIONS

None.

FIELD OF THE INVENTION

The present invention relates generally to a method for logging a subterranean borehole. More specifically, this invention relates to processing measured data regarding a subterranean parameter in combination with a sensor response function so that the result more faithfully represents the azimuthal dependence of the data. Subterranean depth data may then be associated therewith, for example, so as to enable imaging.

BACKGROUND OF THE INVENTION

Logging techniques for determining numerous borehole and formation characteristics are well known in oil drilling and production applications. Such logging techniques include, for example, natural gamma ray, spectral density, neutron density, inductive and galvanic resistivity, micro-resistivity, acoustic velocity, acoustic caliper, physical caliper, downhole pressure, and the like. In conventional wireline logging applications, a probe having various sensors is lowered into a borehole after the drill string and bottom hole assembly (BHA) have been removed. Various parameters of the borehole and formation are measured and correlated with the longitudinal position of the probe as it is pulled uphole. More recently, the development of logging while drilling (LWD) applications has enabled the measurement of such borehole and formation parameters to be conducted during the drilling process. The measurement of borehole and formation properties during drilling has been shown to improve the timeliness and quality of the measurement data and to often increase the efficiency of drilling operations.

LWD tools are often used to measure physical properties of the formations through which a borehole traverses. Formations having recoverable hydrocarbons typically include certain well-known physical properties, for example, resistivity, porosity (density), and acoustic velocity values in a certain range. Such LWD measurements may be used, for example, in making steering decisions for subsequent drilling of the borehole. For example, an essentially horizontal section of a borehole may be routed through a thin oil bearing layer (sometimes referred to in the art as a payzone). Due to the dips and faults that may occur in the various layers that make up the strata, the drill bit may sporadically exit the oil-bearing layer and enter nonproductive zones during drilling. In attempting to steer the drill bit back into the oil-bearing layer (or to prevent the drill bit from exiting the oil-bearing layer), an operator typically needs to know in which direction to turn the drill bit (e.g., up, down, left, or right). In order to make correct steering decisions, information about the strata, such as the dip and strike angles of the boundaries of the oil-bearing layer is generally required. Such information may possibly be obtained from azimuthally sensitive measurements of the formation properties and, in particular, from images derived from such azimuthally sensitive measurements.

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times six or more) sensors (e.g., gamma ray sensors) extending outward from the tool into contact (or near contact) with the borehole wall. It will be appreciated by those of ordinary skill in the art that such wireline arrangements are not suitable for typical LWD applications. In particular, communication bandwidth with the surface would typically be insufficient during LWD operations (e.g., via known mud pulse telemetry techniques) to carry large amounts of image-related data. Further, LWD tools are generally not centralized or stabilized during operation and thus require more rugged sensor arrangements.

Several attempts have been made to develop LWD tools and methods that may be used to provide images of various azimuthally sensitive sensor measurements related to borehole and/or formation properties. Many such attempts have made use of the rotation (turning) of the BHA (and therefore the LWD sensors) during drilling of the borehole. For example, Holenka et al., in U.S. Pat. No. 5,473,158, discloses a method in which sensor data (e.g., neutron count rate) is grouped by quadrant about the circumference of the borehole. Likewise, Edwards et al., in U.S. Pat. No. 6,307,199, Kurkoski, in U.S. Pat. No. 6,584,837, and Spross, in U.S. Pat. No. 6,619,395, disclose similar methods. For example, Kurkoski discloses a method for obtaining a binned azimuthal density of the formation. In the disclosed method, gamma ray counts are grouped into azimuthal sectors (bins) typically covering 45 degrees in azimuth. Accordingly, a first sector may include data collected when the sensor is positioned at an azimuth in the range from about 0 to about 45 degrees, a second sector may include data collected when the sensor is positioned at an azimuth in the range from about 45 to about 90 degrees, and so on.

As described above, one problem with implementing LWD imaging techniques is that imaging techniques, in general, typically require large data storage and/or data transmission capacity. Due to the limited conventional communication bandwidth between a BHA and the surface, as well as limited conventional downhole data storage capacity, the sensor data used to form the images must typically undergo significant quantity reduction. Conventional techniques as described above accomplish such data quantity reduction via "binning" sensor data into a plurality of azimuthal sectors (also referred to bins or azimuthal bins). While binning techniques have been utilized in commercial LWD applications, both real-time and memory LWD images are often coarse or grainy (and therefore of poor quality) and in need of improvement. Such binning techniques may therefore not always be the most optimal approach to forming LWD images.

More recently, commonly assigned U.S. Pat. No. 7,027,926 to Haugland discloses a technique in which LWD sensor data is convolved with a one-dimensional window function. This approach advantageously provides for superior image resolution and noise rejection as compared to the previously described binning techniques. Notwithstanding the improvements disclosed in the '926 patent, there remains room for further improvement of LWD imaging methods. Such improvements may, for example, further improve image quality while not significantly increasing communication bandwidth and/or downhole data storage capacity requirements. Moreover, such improvements may account for the azimuthal sensitivity of the LWD sensor and image blurring (e.g., due to translational or rotational motion of the LWD sensor).

SUMMARY OF THE INVENTION

The present invention addresses one or more of the above-described drawbacks of prior art borehole imaging techniques. Aspects of this invention include a method for forming a borehole image of an azimuthally sensitive formation (or borehole) parameter. Such a borehole image may be formed, for example, by processing logging sensor data with a predetermined sensor response function (also referred to herein as a probability density function) to acquire probabilistically distributed sensor data. In one embodiment, the logging sensor data and the corresponding azimuths are measured during drilling of a borehole while a LWD tool rotates with the drill string in the borehole. The sensor data may be distributed in either one-dimension (azimuthal) or two-dimensions (azimuthal and axial). The probabilistically distributed sensor data may be associated with measured depth of the borehole, for example, to enable imaging.

Exemplary embodiments of the present invention may advantageously provide several technical advantages. In particular, certain embodiments of this invention may be advantageously utilized in LWD imaging applications. For example, exemplary methods according to this invention provide for superior image resolution and noise rejection as compared to prior art binning techniques. Exemplary embodiments of the invention also advantageously conserve logging sensor data (i.e., the data is not over or under sampled during the probabilistic distribution) such that integration of the distributed data over the entire circumference of the tool provides a non-azimuthally sensitive logging measurement.

In one aspect the present invention includes a method for estimating an azimuthal dependence of a parameter of a borehole using logging sensor measurements acquired as a function of sensor azimuth. The method includes rotating a downhole tool in a borehole. The tool includes at least one logging sensor and at least one azimuth sensor, data from the logging sensor being operable to assist determination of a parameter of the borehole. The method further includes causing the at least one logging sensor and the at least one azimuth sensor to acquire at least one data pair, each data pair comprising a logging sensor measurement and a corresponding azimuth, and processing the data pairs with a predetermined probability density function (PDF) to acquire sensor data that is probabilistically distributed in azimuth.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
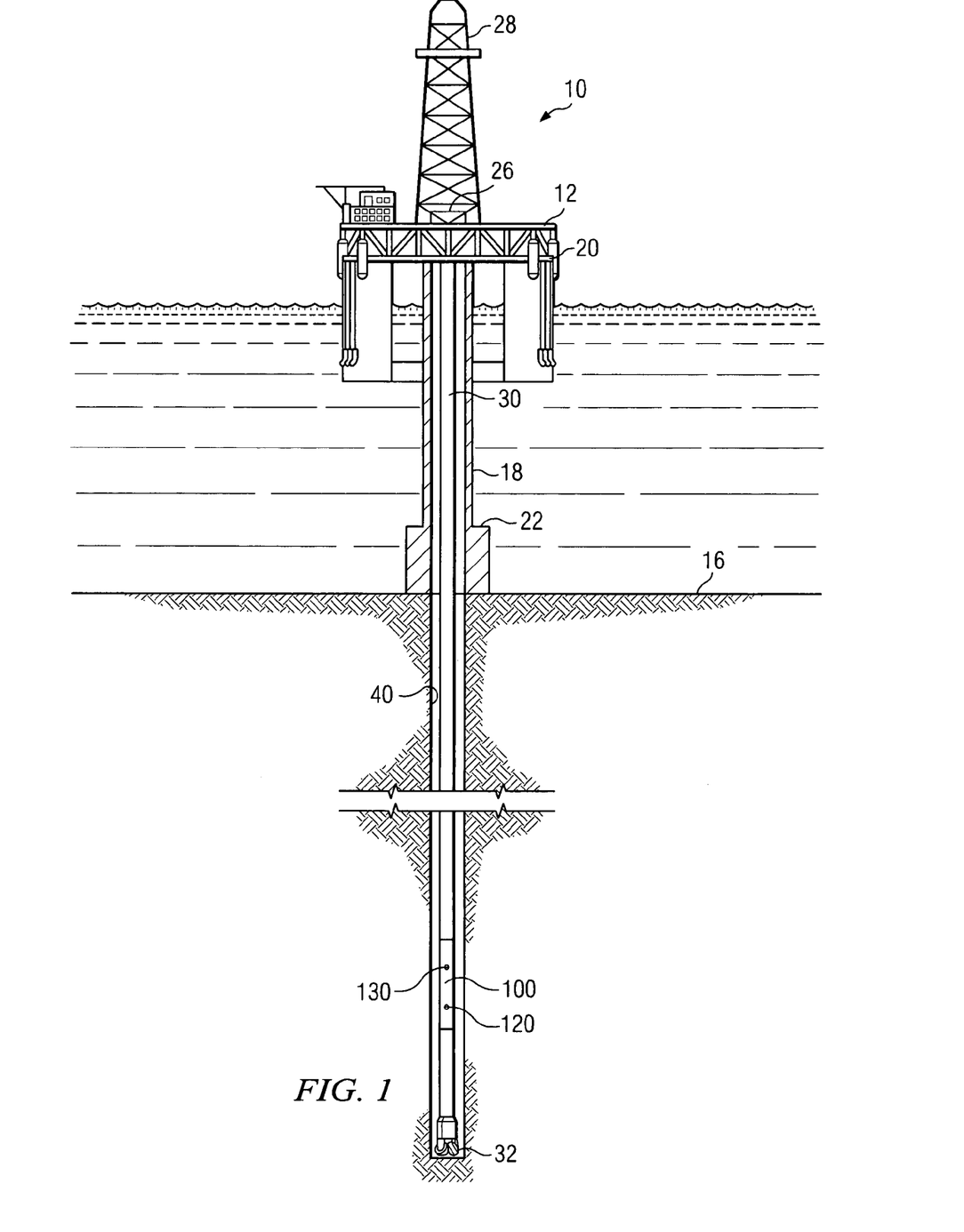
FIG. 1 depicts one exemplary LWD tool suitable for use in accordance with aspects of this invention.

FIG. 1 schematically illustrates one exemplary embodiment of a logging while drilling tool 100 suitable for use in accordance with the present invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and LWD tool 100. LWD tool 100 typically includes at least one LWD sensor 120 and an azimuth sensor 130 deployed thereon. LWD sensor 120 may include substantially any downhole logging sensor, for example, including a natural gamma ray sensor, a neutron sensor, a density sensor, a resistivity sensor, a micro-resistivity sensor, a physical or ultrasonic caliper sensor, a formation pressure sensor, an annular pressure sensor, an ultrasonic sensor, an audio-frequency acoustic sensor, and the like. LWD sensor 120 is configured, as is known to those of ordinary skill in the art, to measure borehole parameters including formation density, formation resistivity, formation acoustic velocity, gamma ray interaction cross section, neutron interaction cross section, caliper interaction cross section, and the like. One example of a suitable LWD resistivity imaging tool is disclosed in co-pending, commonly assigned U.S. patent application Ser. No. 11/080,777 (U.S. Patent Publication No. 2006/0208738), now U.S. Pat. No. 7,436,184.

Azimuth sensor 130 (also referred to in the art as an orientation sensor) may include substantially any sensor that is sensitive to the rotational orientation of the tool 100 in the borehole, such as one or more accelerometers and/or magnetometers. For example, in one exemplary embodiment, a high frequency magnetic surveying device may be utilized, such as disclosed in co-pending, commonly assigned U.S. patent application Ser. No. 11/195,287 (U.S. Patent Publication No. 2007/0030007), now U.S. Pat. No. 7,414,405.

Drill string 30 on FIG. 1 may further include a downhole drill motor, a mud pulse telemetry system for communicating with the surface, and other logging and/or measurement while drilling tools, such as surveying tools, formation sampling tools, drill string steering tools, and the like. It will be understood by those of ordinary skill in the art that the LWD tool 100 of the present invention is not limited to use with a semisubmersible platform 12 as illustrated in FIG. 1. LWD tool 100 is equally well suited for use with any kind of subterranean drilling operation, either offshore or onshore.

In the embodiment of FIG. 1, the LWD sensor 120 and the azimuth sensor 130 are shown as being longitudinally spaced. It will be appreciated that this invention is not limited to any particular layout (positioning) of the LWD sensor 120 and the azimuth sensor 130 on the tool 100. For example, in an alternative embodiment (not shown) the LWD and azimuth sensors may be deployed at substantially the same longitudinal (axial) position. It will also be appreciated that while the embodiment shown on FIG. 1 includes a single LWD sensor 120 and a single azimuth sensor 130, the invention is not limited to any particular number of LWD and azimuth sensors.

LWD tool 100 may further optionally include an energy source (not shown). For example, an LWD tool configured for azimuthal gamma measurements may include a gamma radiation source (such a device is typically referred to as a density measurement device). Likewise, LWD tools configured for azimuthal resistivity and acoustic velocity measurements may include one or more electromagnetic wave generators and acoustic transmitters, respectively. The invention is not limited, however, to the use of an energy source since the LWD sensor 120 may be utilized to measure naturally occurring formation parameters (e.g., a natural gamma ray sensor may be utilized to measure azimuthally sensitive natural gamma ray emissions or a physical caliper may be utilized to measure standoff distance or a borehole diameter).

With continued reference to FIG. 1, downhole tool 100 typically further includes a controller (not shown), e.g., having a programmable processor (not shown), such as a microprocessor or a microcontroller and processor-readable or computer-readable program code embodying logic. A suitable processor may be utilized, for example, to construct images (as described in more detail below) of the subterranean formation based on azimuthally sensitive sensor measurements and associated azimuth and measured depth information. Images of the earth formation may indicate physical properties (e.g., resistivity, dielectric constant, acoustic velocity, density, 3-D caliper, and etc.) of the surrounding formation and/or the materials comprising the strata. A suitable controller may also optionally include other controllable components, such as sensors (e.g., a depth sensor), data storage devices, power supplies, timers, and the like. The controller may also be disposed to be in electronic communication with sensors 120 and 130. A suitable controller may also optionally communicate with other instruments in the drill string, such as, for example, telemetry systems that communicate with the surface. A typical controller may further optionally include volatile or non-volatile memory or a data storage device. Alternatively, the acquired raw sensor data (or pre-processed data) may be sent to the surface via a high-speed (e.g., 1 Mbps in 2007) wired drillstring and then processed at the surface.

In certain drilling operations, such as geo-steering operations, it is advantageous to locate sensors 120 and 130 as low as possible in the BHA, e.g., immediately above the drill bit. This may be accomplished, for example, via deploying sensors 120 and 130 in a near-bit stabilizer housing (or blade) located just above the bit. In one exemplary embodiment, the sensors may be deployed in on the lower end of a rotary steerable tool (e.g., in a near-bit stabilizer). In such an embodiment, the above described controller (or a portion thereof) may be advantageously located in the rotary steerable tool housing. The invention is not limited in these regards.

It will be understood by those of ordinary skill in the art that the term "azimuth" as used herein refers to an angular measurement about the circumference of the tool 100. In particular, the azimuth refers to the angular separation from a point of interest (e.g., LWD sensor 120) to a reference point. The azimuth is typically measured in the clockwise direction (although the invention is not limited in this regard), and the reference point is frequently the high side of the borehole or measurement tool, relative to the earth's gravitational field, or magnetic north. Another important label used in the borehole imaging context is the "toolface" angle. When a measurement tool is used to gather azimuthal imaging data, the point of the tool with the measuring sensor is identified as the "face" of the tool. The tool face angle, therefore, is defined as the angular separation about the circumference of the tool from a reference point to the radial direction of the toolface. In the remainder of this document, the terms azimuth and toolface will be used interchangeably, though the azimuth identifier will be used predominantly.

Probabilistic Image Formation

Figure 2:
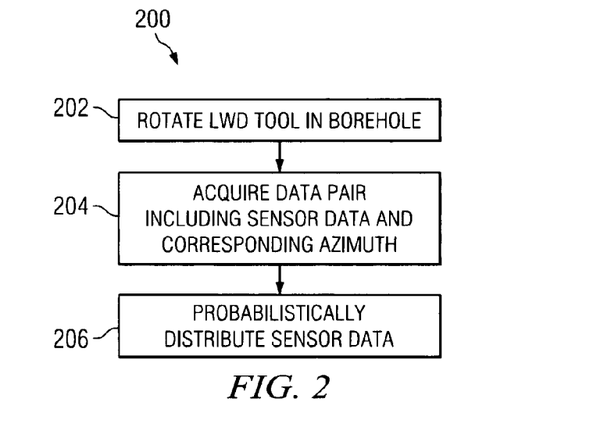
FIG. 2 depicts a flowchart of one exemplary method embodiment of this invention.

Turning now to FIG. 2, one exemplary embodiment of a method 200 according to this invention is illustrated. LWD tool 100 rotates 202 with the drill string in the borehole (e.g., with drill string 30 in borehole 42 shown on FIG. 1). Logging data and azimuth data are measured by LWD sensor 120 and azimuth sensor 130 (FIG. 1), respectively, during rotation of the tool 100 and correlated 204 such that each data point in the sequence of logging data points is assigned an azimuth. The correlated logging data point and azimuth are referred to as a data pair. The sensor data is then distributed azimuthally 206 based upon a predetermined probability density function and the result stored in downhole memory. As described in more detail below, the invention advantageously accounts for the directional response of the sensor (also referred to herein as the azimuthal sensitivity of the sensor) so that higher quality images may be achieved with reduced data requirements (e.g., as compared to prior art binning techniques).

Figure 3:
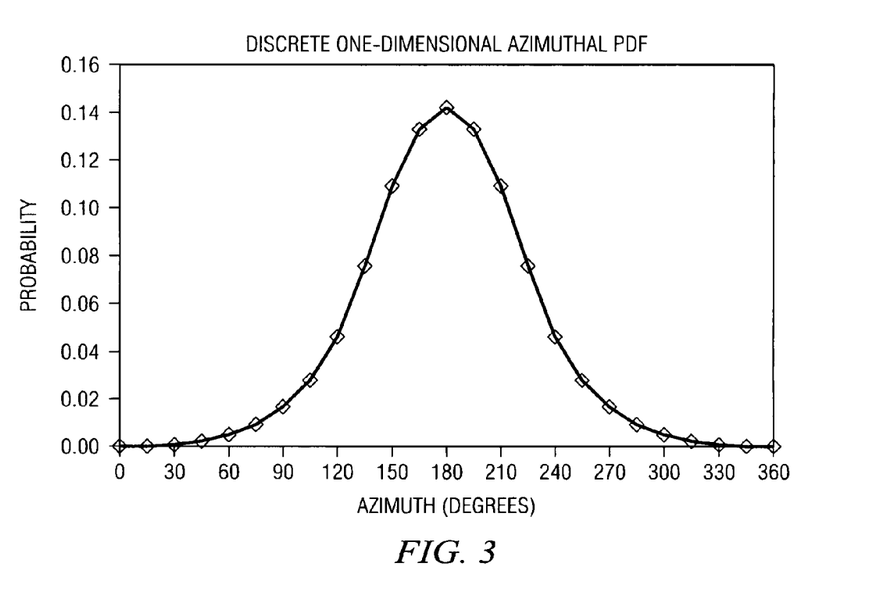
FIG. 3 depicts one exemplary embodiment of an azimuthal sensor probability density function useful in exemplary embodiments of the invention.

As is known to those of ordinary skill in the art, an azimuthally sensitive LWD/MWD sensor is required to construct a two-dimensional azimuthal image (the two dimensions being measured depth and azimuthal position). Azimuthally sensitive sensors are sometimes referred to as focused sensors in the art. With reference to FIG. 3, the azimuthal sensitivity of one exemplary focused sensor embodiment is shown. FIG. 3 plots a simulated probability density function (PDF) for an exemplary gamma ray sensor (a conventional shielded photo multiplier tube). The PDF includes a plot of probability on the vertical axis versus azimuth angle (toolface angle) on the horizontal axis. The sensor response shown on FIG. 3 was simulated at azimuthal increments of 15 degrees using a Monte Carlo computer simulation. A small offset probability has been removed from the PDF shown on FIG. 3. The offset probability was due to imperfect shielding about the photomultiplier tube. Notwithstanding, the invention is not limited in this regard. The exemplary PDF shown on FIG. 3 indicates that if the gamma ray sensor detects a single gamma ray count, then there is an approximately 14 percent likelihood that the gamma ray originated at an azimuth angle of about 0 degrees (in the range from −7.5 to 7.5 degrees). Thus, if the gamma ray sensor detects 500 counts over a certain duration, then 70 of those counts likely originated from an azimuth of about 0 degrees.

Approximately 30 of those counts are from an azimuth of about 45 degrees (in the range from 37.5 to 52.5 degrees), and so on according to the probabilities in the discrete PDF.

It will be appreciated that the simulated sensor response shown on FIG. 3 is approximately Gaussian in shape, having the highest sensitivity in a direction facing directly outward from the tool body (about 0 degrees in FIG. 3). The sensitivity decreases towards zero as the incident angle increases (away from 0 degrees) due to the shielding in the photo multiplier tube. The invention is, of course, not limited in this regard, as sensors including non-Gaussian and asymmetric sensor response functions may also be utilized. Moreover, sensor response functions having substantially any breadth (azimuthal sensitivity) may be used. Suitable sensor response functions may be determined empirically or theoretically. The invention is again not limited in these regards.

LWD sensor PDFs may be expressed mathematically, for example, as follows:

$$P_{Az}[-\pi < \phi < \pi] = \int_{\phi=-\pi}^{\phi=\pi} p_{Az}(\phi) \cdot d\phi = 1 \qquad \text{Equation 1}$$

where $\phi$ represents the azimuth angle in radians, $P_{Az}$ represents the total probability of receiving a signal (typically equal to one as shown), and $p_{Az}(\phi)$ represents the PDF as a function of the azimuth angle. LWD sensor PDFs may also be expressed in discrete form, for example, as follows:

$$P'_{Az}[-180 \le x < 180] = \sum_{m=-180}^{m=180-1} P'_{Az}(m) = 1 \qquad \text{Equation 2}$$

where n represents discrete azimuth increments (e.g., one-degree increments from −180 to 180 degrees), $P'_{Az}$ represents the total discrete probability of receiving a signal (again typically equal to one as shown), and $P'_{Az}(m)$ represents the discrete PDF as a function of the discrete azimuth angles in degrees. The azimuthal angle may be expressed in any units, for example, including degrees, radians, minutes, seconds, etc. Alternatively, azimuthal position may be expressed as a circumferential distance, for example, in units of inches, meters, millimeters, etc.

In general an image may be thought of as a two-dimensional representation of a parameter value determined at discrete positions. For the purposes of this disclosure, borehole imaging may be thought of as a two-dimensional representation of a measured formation (or borehole) parameter at discrete azimuths and borehole depths. Such borehole images thus convey the dependence of the measured formation (or borehole) parameter on the borehole azimuth and depth. It will therefore be appreciated that one purpose in forming such images of particular formation or borehole parameters (e.g., formation resistivity, dielectric constant, density, acoustic velocity, etc.) is to determine the actual azimuthal dependence of such parameters as a function of the borehole depth. Determination of the actual azimuthal dependence may enable a value of the formation parameter to be determined at substantially any arbitrary azimuth, for example via interpolation. The extent to which a measured image differs from the actual azimuthal dependence of a formation parameter may be thought of as image distortion. Such distortion may be related, for example, to statistical measurement noise and/or other effects, such as aliasing and motion blur. Notwithstanding, minimizing image distortion advantageously improves the usefulness of borehole images in determining the actual azimuthal dependence of the borehole parameters.

In order to minimize the above-described image distortion, formation data is accumulated for a predetermined number of drill string rotations or for a predetermined time. The formation data may be probabilistically distributed in substantially real-time as the data is acquired or at the end of the predetermined number of rotations or the predetermined time.

In one exemplary serviceable embodiment of this invention, an energy source (e.g., a gamma radiation source) emits energy radially outward and in a sweeping fashion about the borehole as the tool rotates therein. Some of the gamma radiation from the source interacts with the formation and is detected at a gamma ray detector within the borehole. Typically the detector is also rotating with the tool. The sensor may be configured, for example, to average the detected radiation (the azimuthally sensitive sensor data) into a plurality of data packets, each acquired during a single rapid sampling period. As is known to those of ordinary skill in the art, gamma ray data typically includes a number of received counts in a predetermined time period. The duration of each sampling period is preferably significantly less than the period of the tool rotation in the borehole (e.g., the sampling period may be about 10 milliseconds or less while the rotational period of the tool may be about 0.5 seconds). Meanwhile, the azimuth sensor measures the azimuth of the tool, and correspondingly the gamma ray sensor, as the tool rotates in the borehole. An azimuth is then assigned to each data packet. The azimuth is preferably measured for each sampling period, or often enough so that the azimuth of the tool may be determined for each sampling period, although the invention is not limited in this regard. It will thus be understood that each data packet includes a data pair including a sensor measurement (e.g., a number of gamma counts) and a corresponding azimuth measurement (a toolface angle).

As the data is acquired, it is typically grouped into a 1×360 temporary image array having a 1-degree angular resolution (i.e., 360 discrete angular sectors). Logging data is acquired in this way for a predetermined number of drill string rotations, a predetermined period of time (e.g., 10 seconds), and/or until a predetermined number of data packets are acquired (e.g., 1000). The result is a temporary one-dimensional image (sensor response vs. azimuth). The temporary image may be thought of as a fine-resolution raw count image (typically having a high degree of noise). The sensor data in each pixel of the temporary image array may then be distributed in azimuth by multiplying the data from that pixel by the sensor PDF (which is itself an array centered on each pixel of the temporary image array). This may be expressed mathematically, for example, as follows:

$$I_{FINAL}[m] = \sum_{i=0}^{M-1} I_{RAW}[i] \cdot P'_{Az}[(m-i) \bmod M] \qquad \text{Equation 3}$$

where M represents the number of discrete angular positions such that m=0,1, ..., M−1 and i=0,1, ..., M−1, $I_{RAW}[i]$ represents the temporary image array, $I_{FINAL}[m]$ represents the probabilistically distributed sensor data, and $P'_{Az}[(m-i) \bmod M]$ represents the discrete PDF (for example as shown in Equation 2). In the exemplary embodiment described above, M=360 (i.e., 360 1-degree azimuthal increments). The notation $P'_{Az}[(m-i) \bmod M]$ indicates that the PDF is a circular function about the tool azimuth (i.e., conventional modular mathematics are used to solve Equation 3). It will be appreciated that Equation 3 advantageously conserves the logging sensor data (e.g., the number of gamma counts in the exemplary embodiment described above) such that:

$$\sum_{m=0}^{M-1} I_{FINAL}[m] = \sum_{m=0}^{M-1} I_{RAW}[m] \qquad \text{Equation 4}$$

Figure 4:
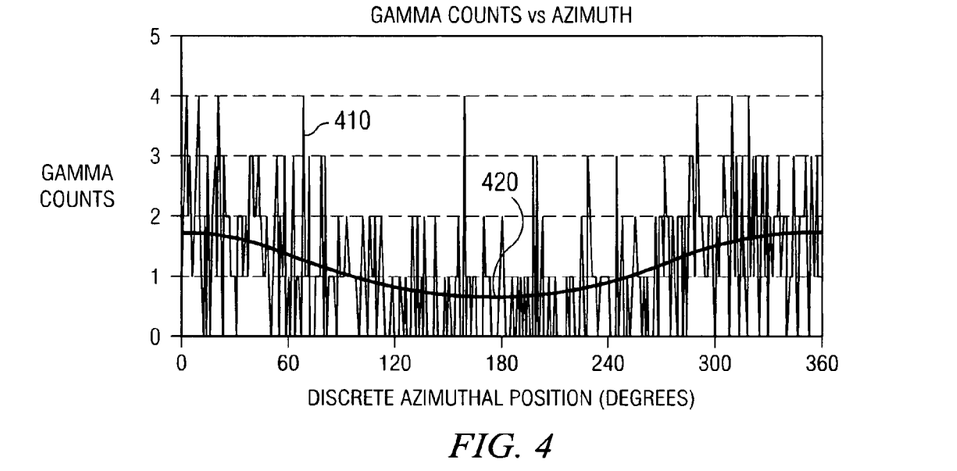
FIG. 4 depicts a plot of raw data in a temporary image array and probabilistically distributed sensor data on the vertical axis versus sensor azimuth on the horizontal axis.

With reference now to FIG. 4, it will be appreciated that $I_{RAW}[i]$ and $I_{FINAL}[m]$ represent a single line of a borehole image (i.e., acquired at approximately a single measured depth in the borehole). FIG. 4 plots simulated logging data (gamma counts in the exemplary embodiment shown) on the vertical axis as a function of sensor azimuth on the horizontal axis. The raw sensor data in the temporary image array is shown at 410. Probabilistically distributed sensor data is shown at 420. The probabilistically distributed sensor data is generated via Equation 3 using a discrete PDF having an angular resolution of 1 degree and an azimuthal sensitivity similar to the exemplary PDF shown on FIG. 3. Note that the probabilistically distributed data 420 show a maxima in gamma counts at an azimuth of approximately 350 degrees and a minima in gamma counts at an azimuth of approximately 160 degrees.

The sensor response of azimuth sensor 130 (FIG. 1) may also be accounted for in computing $I_{FINAL}[m]$. It will be understood that the azimuthal sensitivity of the azimuthal sensor tends to be directly related to the measurement frequency and the rotation rate of the drill string. In the exemplary embodiment described above, sensor measurements may be acquired, for example, at 10 millisecond intervals. For a drill collar rotating at 200 rpm, tool face angles may be determined 30 times per revolution (i.e., at 12 degree intervals). The response of the azimuth sensor can also, at times, depend on other factors such as drill string vibration (e.g., torsional vibration which is often referred to as stick-slip in the art). In exemplary embodiments of the invention the response of the azimuth sensor may also be expressed as a PDF. A Gaussian function has been found to be a suitable approximation of the azimuth sensor response, although the invention is not limited in this way. In computing $I_{FINAL}[m]$, the LWD sensor data in each pixel of the temporary image array may then be distributed in azimuth by multiplying the value stored in that pixel by both the LWD sensor PDF and the azimuth sensor PDF. This may be expressed mathematically, for example, as follows:

$$I_{FINAL}[m] = \sum_{i=1}^{M-1} I_{RAW}[i] \cdot P'_{Az}[(m-i) \bmod M] \cdot P'_{R}[(m-i) \bmod M] \qquad \text{Equation 5}$$

where M, $I_{RAW}[i]$, $I_{FINAL}[m]$, and $P'_{Az}[(m-i) \bmod M]$ are as defined above with respect to Equation 3 and $P'_{R}[(m-i) \bmod M]$ represents a discrete PDF for the azimuth sensor. It will be appreciated that the product $P'_{Az}[(m-i) \bmod M] \cdot P'_{R}[(m-i) \bmod M]$ may also be expressed as a single PDF incorporating the sensitivity functions of both the LWD and azimuth sensors. Moreover, it will also be appreciated that in certain applications the PDF of the LWD sensor may be ignored and $I_{FINAL}[m]$ computed using only the PDF of the azimuth sensor. For example, in imaging applications including highly focused LWD sensors (e.g., including a physical caliper or a micro-resistivity sensor), suitable images may be computed using a PDF of the azimuth sensor alone. The invention is not limited in these regards.

Figure 5:
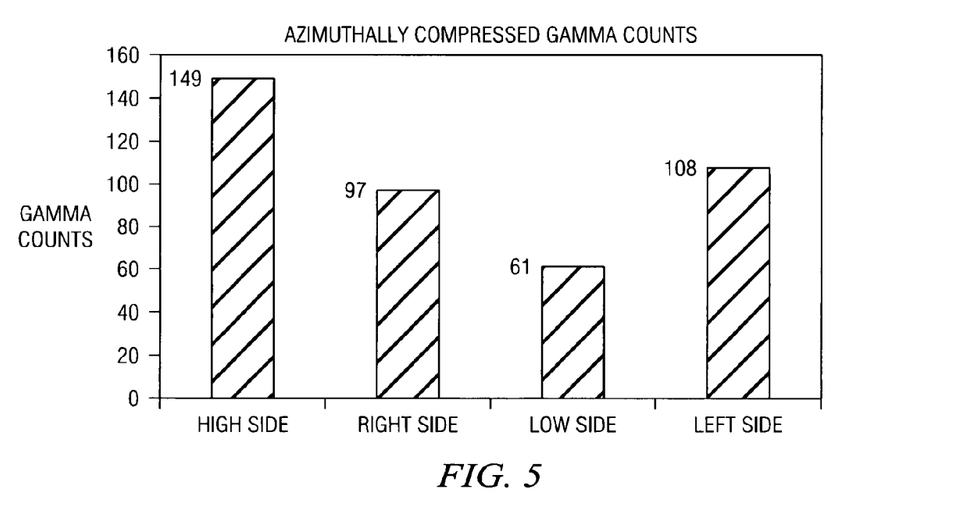
FIG. 5 depicts a bar chart of compressed probabilistically distributed sensor data from the plot shown on FIG. 4

Probabilistically distributed data 420 is typically stored to downhole memory and/or transmitted to the surface. It will be appreciated that the probabilistically distributed data may be compressed prior to storage and/or transmission (depending on available downhole memory capacity and transmission bandwidth). The probabilistically distributed image may be considered as an effective compression since high-spatial frequency components of the original image are removed. Therefore, since less information is carried by the distributed image, it is ideally suited for known frequency domain compression algorithms (e.g., conventional JPEG-DCT and MPEG-1, -2, -3 algorithms). Image compression may also be achieved in the spatial domain via integration (summation) of the data in predetermined azimuthal sectors. While integration results in a loss of azimuthal resolution, it advantageously preserves sensor data (e.g., gamma counts in the examples described above). In one exemplary embodiment, the probabilistically distributed data may be stored in 24 azimuthal sectors, the first sector including a sum of the probabilistic sensor data having an azimuth from 0 to 14 degrees, the second sector including a sum of the probabilistic sensor data having and azimuth from 15 to 29 degrees, and so on. Further compression may be required for real-time transmission of the data to the surface. For example, in one exemplary embodiment, probabilistic sensor data is stored (and transmitted to the surface) in four azimuthal sectors representing high side, right side, low side, and left side of the tool (−45 to 44 degrees, 45 to 134 degrees, 135 to 224 degrees, and 225 to 314 degrees respectively). As is known to those of ordinary skill in the art, high side typically refers to the high side of the tool relative to the earth's gravitational field. FIG. 5 depicts a bar chart of compressed probabilistically distributed sensor data from FIG. 4.

It will be appreciated that in order to form a two-dimensional image (azimuthal position versus well depth), sensor data may be acquired at a plurality of well depths using the procedure described above. In one exemplary embodiment, sensor data may be acquired substantially continuously during at least a portion of a drilling operation. Sensor data may be grouped by time (e.g., in 10 second intervals) with each group indicative of a single well depth. The data in each group is typically probabilistically distributed in azimuth as described above with respect to Equations 3 and 4. As described in the above exemplary embodiment, each data packet may be acquired in about 10 milliseconds. Such data packets may be grouped in about 10 second intervals resulting in about 1000 data packets per group. At a drilling rate of about 60 feet per hour, each group represents about a two-inch depth interval. It will be appreciated that this invention is not limited to any particular rapid sampling and/or time periods. Nor is this invention limited by the description of the above exemplary embodiments.

It will also be appreciated that embodiments of this invention may be utilized in combination with substantially any other known methods for correlating the above described time dependent sensor data with depth values of a borehole. For example, the probabilistically distributed data obtained in Equation 3 may be tagged with a depth value using known techniques used to tag other LWD data. The probabilistically distributed data may then be plotted as a function of azimuthal position and depth to generate an image.

In certain embodiments it may be advantageous to probabilistically distribute the sensor data in two dimensions (i.e., azimuthally and axially). As with the above described one-dimensional (azimuthal) process, data from a single depth may be advantageously stored in a high-resolution temporary image array. The sensor data in each pixel of the temporary image array may then be distributed both azimuthally and axially by multiplying the data from that pixel by a two-dimensional sensor PDF. One example of a two-dimensional sensor PDF is shown on FIG. 6, which plots probability on the vertical axis versus sensor azimuth and measured depth (or time) on the horizontal axes. The probability has a peak at an azimuth of zero degrees (relative to the sensor) and a measured depth at the center of the sensor. In the exemplary embodiment shown, the two-dimensional sensor PDF is approximated by a two-dimensional Gaussian function, although the invention is not limited in this regard.

Figure 6:
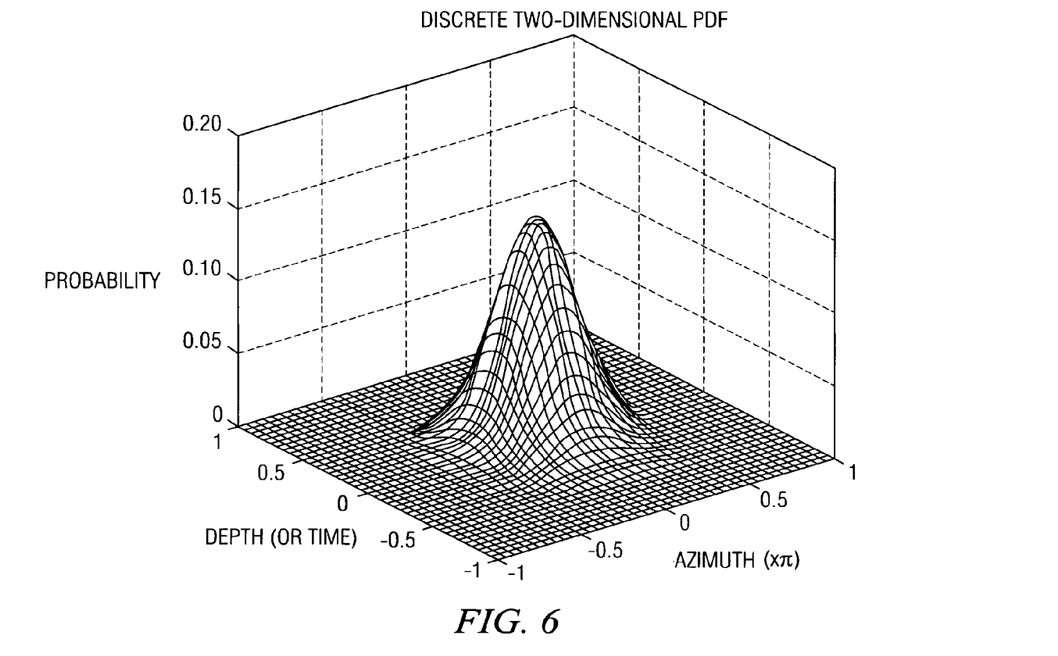
FIG. 6 depicts one exemplary embodiment of a two-dimensional sensor probability density function useful in exemplary embodiments of the invention.

The two-dimensional probabilistically distributed sensor data may be expressed mathematically, for example, as follows:

$$I_{FINAL}[m, n] = \sum_{i=0}^{M-1} \sum_{j=0}^{L-1} I_{RAW}[i, j] \cdot P_2'[(m-i) \bmod M, n-j] \quad \text{Equation 6}$$

where M represents the number of discrete angular positions such that m=0,1, . . . , M−1 and i=0,1, . . . , M−1, L represents the number of discrete axial positions in the temporary image array such that j=0,1, . . . , L−1, N represents the number of discrete axial positions in the final image such that n=0,1, . . . , N−1, $I_{RAW}[i,j]$ represents a two-dimensional temporary image array, $I_{FINAL}[m,n]$ represents the probabilistically distributed sensor data, and $P_2'[(m-i) \bmod M, n-j]$ represents a two-dimensional discrete PDF (for example as shown on FIG. 6). While Equation 6 utilizes a two-dimensional temporary image array, it will be understood that a one-dimensional temporary image array may likewise be probabilistically distributed in two-dimensions. It will be appreciated that $I_{FINAL}[m,n]$ has a greater number of axial positions than $I_{RAW}[i,j]$ due to the distribution of the sensor data in the axial direction. In particular, N=L+K−1 where K represents the number of axial positions in the PDF. As such, $I_{FINAL}[m,n]$ includes K−1 additional rows, for example, extending K/2 rows above and K/2−1 rows below $I_{RAW}[i,j]$. Successively distributed images will, of course, be partially overlaid in constructing a final borehole image.

Figure 7:
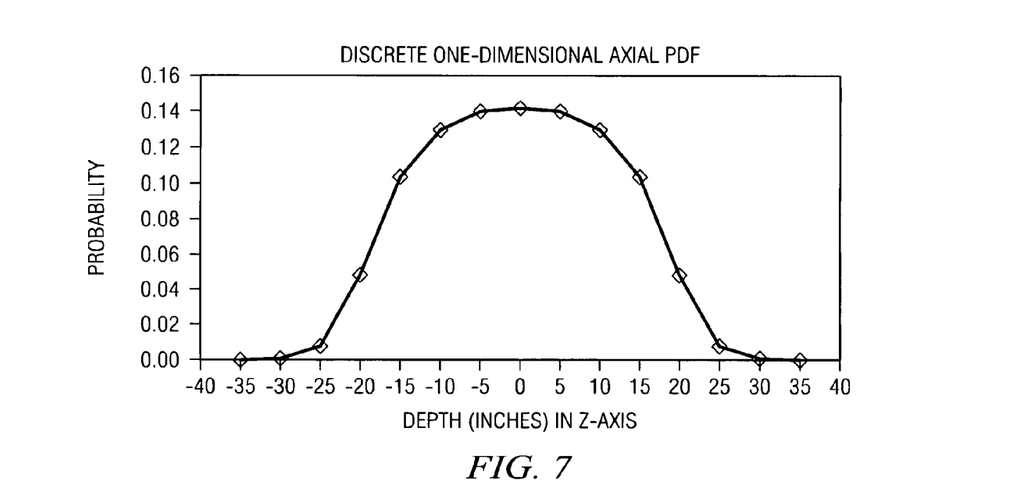
FIG. 7 depicts one exemplary embodiment of an axial sensor probability density function useful in exemplary embodiments of the invention.

It will be appreciated that Equation 6 may be re-written such that the two-dimensional PDF $P_2'[(m-i) \bmod M, n-j]$ is replaced with the product of the azimuthal and axial PDFs ($P'_{Az}[(m-i) \bmod M] \cdot P'_{Ax}[n-j]$). FIG. 7 depicts one exemplary embodiment of a simulated axial PDF for an exemplary gamma ray sensor (a conventional shielded photo multiplier tube). The PDF shown on FIG. 7 includes a plot of probability on the vertical axis versus axial distance from the sensor in inches on the horizontal axis. The sensor response shown on FIG. 7 was simulated at axial increments of five inches using a Monte Carlo computer simulation. It will be understood that the PDF shown on FIG. 7 is merely exemplary and that the invention is not limited in this regard.

As described above, substantially any suitable number of discrete angular and axial positions may be utilized. For example, in one exemplary embodiment, M=360 (i.e., 360 1 degree azimuthal increments) and N=73 (i.e., 36 one-inch increments above the sensor and 36 one-inch increments below the sensor. As described above with respect to Equation 3, the notation $P_2'[(m-i) \bmod M, n-j]$ indicates that the PDF is a circular function about the tool azimuth (i.e., conventional modular mathematics are used to solve Equation 5). It will also be appreciated that the above described methodology described in Equation 6 advantageously conserves the log-ging sensor data (e.g., the number of gamma counts in the exemplary embodiment described above) such that:

$$\sum_{m=0}^{M-1} \sum_{n=0}^{N-1} I_{FINAL}[m, n] = \sum_{i=0}^{M-1} \sum_{j=0}^{L-1} I_{RAW}[i, j] \quad \text{Equation 7}$$

Image Restoration Techniques

Probabilistic imaging, while advantageously reducing noise, also tends to blur borehole images owing to the limited azimuthal (and axial) sensitivity of the LWD sensor. Image blurring reduces the contrast of and reduces high frequency components from the constructed image. However, such high frequency components are sometimes of interest in the borehole image. Thus it is sometimes advantageous to de-blur the borehole image and recover at least a portion of the high frequency information. Several exemplary image restoration (de-blurring) methodologies in accordance with this section are described below. In multi-dimensional signal processing, this technique may be referred to as image deblurring, image restoration, or 2-D de-convolution.

Figure 8:
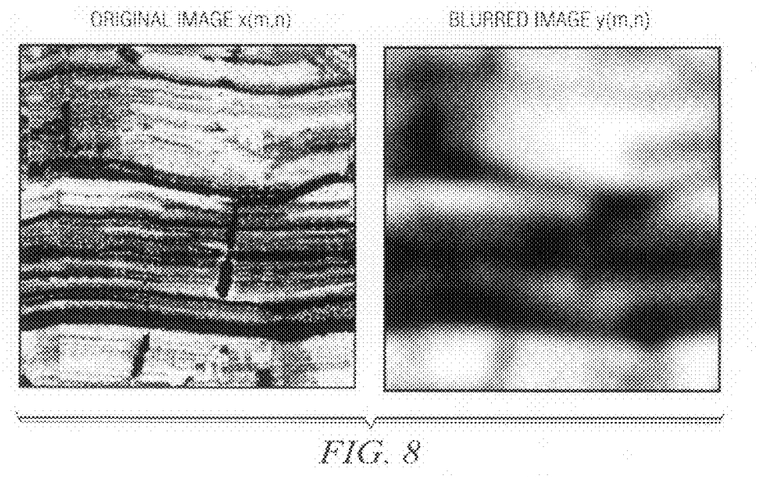
FIG. 8 depicts original and blurred grayscale wireline resistivity images for the purpose of illustrating another exemplary method embodiment of the invention.

Turning now to FIG. 8, original and blurred grayscale wireline resistivity images are shown for the purpose of illustrating exemplary embodiments of the invention. As is conventional in the art, the horizontal axis of each image represents the azimuth (toolface) and the vertical axis of each axis represents the measured depth of the borehole. The measured parameter (resistivity) is indicated by the grayscale of the image with white being highest and black being lowest. The original image x(m,n) is a high resolution wireline resistivity map showing various strata and electrical features of a subterranean formation. The blurred image y(m,n) was obtained by applying a blurring filter function h(m,n) to the original image. In the exemplary embodiment shown, a two-dimensional Gaussian filter was utilized. It will be appreciated that in certain exemplary embodiments, the two-dimensional sensitivity function of an LWD sensor may be represented as a two-dimensional Gaussian, although the invention is not limited in this regard.

Those of ordinary skill in the art will readily recognize that the impulse response and the frequency response of a two-dimensional Gaussian filter may be represented mathematically as follows:

$$h(x, y) = \frac{1}{\sqrt{2\pi} \, \sigma} e^{-\frac{1}{2}\left(\frac{x^2}{\sigma_x^2} + \frac{y^2}{\sigma_y^2}\right)} \quad \text{Equation 8}$$

$$H(u, v) = \frac{1}{2\pi \sigma_u \sigma_v} e^{-\frac{1}{2}\left(\frac{u^2}{\sigma_u^2} + \frac{v^2}{\sigma_v^2}\right)} \quad \text{Equation 9}$$

where $\sigma_u = 1/2\pi\sigma_x$ and $\sigma_v = 1/2\pi\sigma_y$, h(x,y) represents the impulse response (also referred to herein as the blurring filter function), H(u,v) represents the frequency response, x and y represent the horizontal and vertical axes of the image, u and v represent the horizontal and vertical axes in frequency space, and σ represents the standard deviation.

The effect of Gaussian smoothing (or low-pass filtering) is to blur an image with the degree of smoothing (blurring) being determined by the standard deviation of the Gaussian. Likewise, while the invention is not limited to Gaussian PDFs, it will be understood that probabilistically distributing the LWD sensor data also tends to have the effect of blurring the image. Windowing algorithms disclosed in commonly assigned U.S. Pat. No. 7,027,926 to Haugland also tends to have the effect of blurring (low pass filtering) the original image. Such image blurring may be expressed mathematically, for example, as follows:

$$x(m,n) \rightarrow [h(m,n)] \rightarrow y(m,n) \qquad \text{Equation 10}$$

where, as described above, x(m,n) represents the original image, h(m,n) represents the blurring function (e.g., the sensor PDF), and y(m,n) represents the blurred image. The blurring process may be alternatively expressed in the frequency domain as:

$$Y(u,v) = X(u,v) \cdot H(u,v).$$

In one exemplary aspect of the present invention, a de-blurring function g(m,n) is applied to the blurred image to obtain a restored image $\hat{x}(m,n)$. The objective of the de-blurring filter g(m,n) is to minimize the distortion between x(m,n) and $\hat{x}(m,n)$. The process of blurring and de-blurring may be expressed mathematically, for example, as follows:

$$x(m,n) \rightarrow [h(m,n)] \rightarrow y(m,n) \rightarrow [g(m,n)] \rightarrow \hat{x}(m,n) \qquad \text{Equation 11}$$

The de-blurring process may also be alternatively expressed in the frequency domain as: $\hat{X}(u,v) = G(u,v) \cdot Y(u,v) = G(u,v) \cdot X(u,v) \cdot H(u,v).$ Image restoration techniques, such as described in Equation 11, are typically thought about as being in one of two categories; (i) blind image restoration and (ii) non-blind image restoration. In non-blind de-blurring processes, the blurring function h(m,n) is known a-priori. Thus the de-blurring function g(m,n) may be determined directly from the blurring function. In blind de-blurring processes, the degradation (blurring) of the original image is unknown (e.g., due to various noise components) and is thus estimated from the degraded image.

In LWD imaging applications, the blurring function h(m,n) is typically at least partially known, being the PDF of the LWD sensor response (or the window function utilized in windowing applications). Various noise components (e.g., due to thermal and electronic noise and movement of the sensor in the borehole, however, are unknown and must be estimated from the original image. In applications in which the noise is relatively small (e.g., when the noise power in the image is significantly less than the signal power), inverse filters may be advantageously utilized. Such inverse filters include, for example, a conventional inverse filter, a pseudo-inverse filter, and a radially limited inverse filter, exemplary embodiments of which are expressed mathematically as follows in Equations 12, 13, and 14, respectively:

$$G(u,v) = \frac{1}{H(u,v)} \qquad \text{Equation 12}$$

$$G(u,v) = \begin{cases} \frac{1}{H(u,v)} & |H(u,v)| > \delta \\ 0 & |H(u,v)| \leq \delta \end{cases} \qquad \text{Equation 13}$$

$$G(u,v) = \begin{cases} \frac{1}{H(u,v)} & \sqrt{u^2+v^2} \leq R \\ 0 & \sqrt{u^2+v^2} > R \end{cases} \qquad \text{Equation 14}$$

where H(u,v) and G(u,v) represent the blurring and de-blurring functions in the frequency domain, u and v represent the two-dimensional frequency space, δ represents a blurring function threshold below which G(u,v) is set to zero, and R represents frequency threshold above which G(u,v) is set to zero.

Another class of image restoration filters includes Wiener filters (also known as least square filters). Wiener filters are used to minimize the mean-square error energy such that | $\hat{X}(u,v) - X(u,v)|^2$ is a minimum (X(u,v) and $\hat{X}(u,v)$ represent the original and restored images in the frequency domain). Since the square root operator increases monotonically, the Wiener filter also minimizes the root mean-square error (rms). One exemplary Wiener filter may be expressed mathematically, for example, as follows:

$$G(u,v) = \frac{H*(u,v)}{|H(u,v)|^2 + K} \qquad \text{Equation 15}$$

where H(u,v) and G(u,v) represent the blurring and de-blurring functions in the frequency domain, u and v represent the two-dimensional frequency space, K represents the ratio of the square of the noise power to the square of the signal power ($\sigma_W^2/\sigma_X^2$), and H*(u,v) represents a complex conjugation of the blurring function. When both the spectral content of the expected image and the noise can be estimated, the Wiener filter is used to attenuate those frequencies according to their signal to noise ratio, while de-blurring the distorted image. Borehole images (as with typical photographs) often have strong low frequency components and weak high-frequency components. Noise often has a flat frequency response. The parameter, K, is chosen to optimize the estimate and the equation derived using a least squares method (such methods are known to those of ordinary skill in the art).

Figure 9:
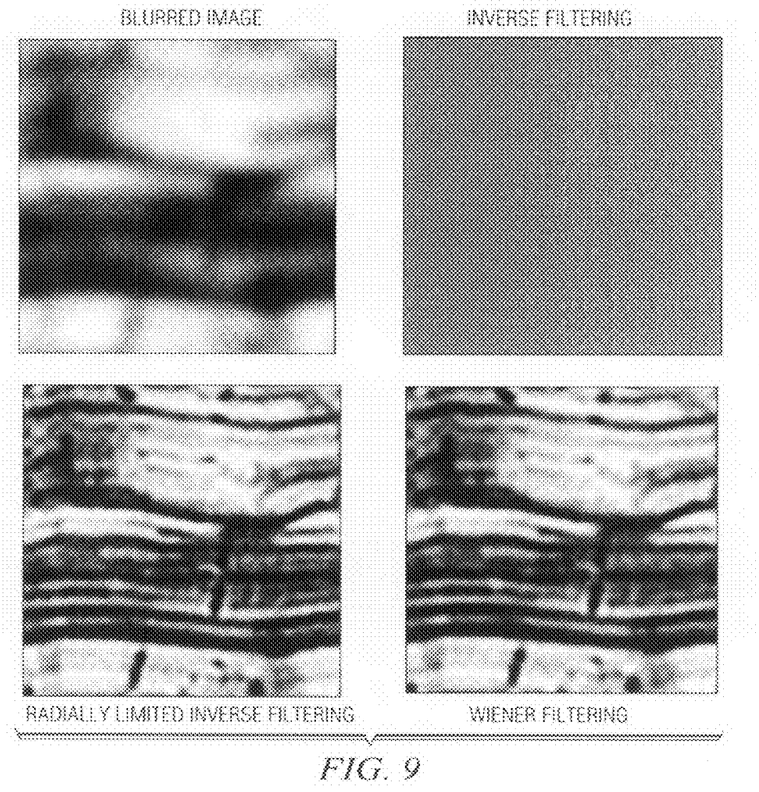
FIG. 9 depicts the blurred resistivity image from FIG. 7 as restored using three distinct de-blurring filters: (i) an inverse filter, (ii) a radially limited inverse filter, and (iii) a Wiener filter.

With reference now to FIG. 9, the blurred resistivity image from FIG. 8 is shown restored using three distinct de-blurring filters: (i) an inverse filter, (ii) a radially limited inverse filter, and (iii) a Wiener filter. Comparison of FIGS. 8 and 9 shows that the radially limited inverse filter and the Wiener filter provide a good quality restoration of the original borehole image in which the strata and various features of the image are readily evident. The Wiener filter has also been found to advantageously restore motion blur. Motion blur may be expected to occur due to both the translational and rotational motion of the LWD sensor in the borehole. For example, rotation of the drill string may cause a blurring (smearing) of the image in the azimuthal direction.

It will be understood that the above described two-dimensional image restoration filters may also be used as two sequential one-dimensional filters. For example, an image may first be filtered in the azimuthal direction and later filtered in the axial direction. Moreover, images may be filtered in only a single dimension. For example, images may be filtered only in the azimuthal direction to remove motion blur.

Other available de-blurring filters include the Regularized filter (a constrained least square restoration algorithm), the Lucy-Richardson algorithm, the damped Lucy-Richardson algorithm, and the like. Wavelet-based algorithms may also be utilized. Such Wavelet-based algorithms are an emerging technology commonly used in JPEG-2000 and MPEG-4 formats.

It will be understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Alternatively the processing system may be at the surface and configured to process data sent to the surface by sensor sets via a telemetry or data link system also well known in the art. One example of high-speed downhole telemetry systems is a wired drillstring, which allows high-speed two-way communications (1 Mbps available in 2007). Electronic information such as logic, software, or measured or processed data may be stored in memory (volatile or nonvolatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for estimating an azimuthal dependence of a parameter of a borehole using logging sensor measurements acquired as a function of sensor azimuth, the method comprising:
    (a) rotating a downhole tool in a borehole, the tool including at least one logging sensor and at least one azimuth sensor, data from the logging sensor being operable to assist determination of a parameter of the borehole;
    (b) causing the at least one logging sensor and the at least one azimuth sensor to acquire at least one data pair during each of predetermined first and second time periods, each of the data pairs comprising a logging sensor measurement and a corresponding azimuth;
    (c) processing the data pairs acquired in (b) with a predetermined probability density function (PDF) to calculate sensor data that is probabilistically distributed in azimuth; and
    (d) assigning corresponding first and second borehole depth values to the probabilistically distributed sensor data determined in (c) using data pairs acquired during the first and second time periods.

2. The method of claim 1, wherein the PDF includes a response function of the azimuthal sensitivity of the logging sensor.

3. The method of claim 1, wherein the PDF includes a response function of the azimuthal sensitivity of the azimuth sensor.

4. The method of claim 1, wherein the PDF is a discrete function.

5. The method of claim 1, wherein the logging sensor is selected from the group consisting of a natural gamma ray sensor, a neutron sensor, a density sensor, a resistivity sensor, a micro-resistivity sensor, a formation pressure sensor, an annular pressure sensor, an ultrasonic sensor, an audio-frequency acoustic sensor, and a physical caliper.

6. The method claim 1, wherein the parameter of the borehole is selected from the group consisting of formation density, formation resistivity, formation acoustic velocity, gamma ray interaction cross section, neutron interaction cross section, and caliper interaction cross section.

7. The method of claim 1, wherein the tool further comprises a controller, the controller disposed to cause the at least one logging sensor and the at least one azimuth sensor to acquire the plurality of data pairs in (b), the controller further disposed to process the data pairs with a predetermined PDF in (c).

8. The method of claim 1, wherein the at least one logging sensor and the at least one azimuth sensor acquire the plurality of data pairs in (b) during rotation of the tool in (a).

9. The method of claim 1, wherein:
    the logging sensor measurements acquired in (b) are stored in a one-dimensional temporary image array; and
    the sensor data is probabilistically distributed in (c) via multiplying the temporary image array with the PDF.

10. The method of claim 1, wherein the sensor data is probabilistically distributed in first and second, azimuthal and axial dimensions.

11. The method of claim 1, further comprising:
    (e) spatially compressing said probabilistically distributed sensor data, the spatial compressing including summing the probabilistically distributed sensor data in each of a plurality of predetermined azimuthal sectors.

12. The method of claim 11, comprising between 4 and 24 azimuthal sectors.

13. The method of claim 11, further comprising a step selected from the group consisting of: (i) storing said spatially compressed sensor data to downhole memory and (ii) telemetering said spatially compressed sensor data to a surface location.

14. The method of claim 1, further comprising
    (e) processing said probabilistically distributed sensor data acquired in (c) with a de-blurring filter.

15. The method of claim 14, wherein the de-blurring filter is selected from the group consisting of: an inverse filter, a pseudo-inverse filter, a radially limited inverse filter, and a Wiener filter.

16. A method for forming an image of a parameter of a borehole using logging sensor measurements acquired as a function of sensor azimuth, the method comprising:
    (a) rotating a downhole tool at a first longitudinal position in the borehole, the tool including at least one logging sensor and at least one azimuth sensor, data from the logging sensor being operable to assist forming the image;
    (b) causing the at least one logging sensor and the at least one azimuth sensor to acquire at least one data pair, each data pair comprising a logging sensor measurement and a corresponding azimuth;
    (c) processing the data pairs acquired in (b) with a predetermined probability distribution function (PDF) to calculate sensor data that is probabilistically distributed in azimuth;
    (d) repositioning the downhole tool and rotating it at a second longitudinal position in the borehole and repeating (b) and (c); and
    (e) assigning a first depth value to said probabilistically distributed sensor data determined in (c) and a second depth value to said probabilistically distributed sensor data determined in (d).

17. The method of claim 16, wherein the logging sensor is selected from the group consisting of a natural gamma ray sensor, a neutron sensor, a density sensor, a resistivity sensor, a micro-resistivity sensor, a formation pressure sensor, an annular pressure sensor, an ultrasonic sensor, and an audio-frequency acoustic sensor and a physical caliper.

18. The method claim 16, wherein the parameter of the borehole is selected from the group consisting of formation density, formation resistivity, formation acoustic velocity, gamma ray interaction cross section, neutron interaction cross section and caliper interaction cross section.

19. The method of claim 16, wherein the sensor data is probabilistically distributed in (c) according to the following equation:

$$I_{FINAL}[m] = \sum_{i=0}^{M-1} I_{RAW}[i] \cdot P'_1[(m-i) \bmod M]$$

wherein M represents a number of discrete angular positions such that m=0,1, ..., M−1 and i=0,1, ..., M−1, $I_{RAW}[i]$ represents a temporary image array, $I_{FINAL}[m]$ represents said probabilistically distributed sensor data, $P'_1[(m-i) \bmod M]$ represents a discrete PDF, and the notation $P'_1[(m-i) \bmod M]$ indicates that the PDF is a circular function of the azimuth.

20. The method of claim 16, wherein the sensor data is probabilistically distributed in (c) according to at least one equation selected from the group consisting of:

$$I_{FINAL}[m,n] = \sum_{i=0}^{M-1}\sum_{j=0}^{L-1} I_{RAW}[i,j] \cdot P'_2[(m-i) \bmod M, n-j] \quad (i)$$

$$I_{FINAL}[m,n] = \sum_{i=0}^{M-1}\sum_{j=0}^{L-1} I_{RAW}[i,j] \cdot P'_{Az}[(m-i) \bmod M] \cdot P'_{Ax}[n-j] \quad (ii)$$

wherein $I_{RAW}[i,j]$ represents a one or two dimensional temporary image array, $I_{FINAL}[m,n]$ represents said probabilistically distributed sensor data, M represents a number of discrete angular positions such that m=0,1, ..., M−1 and i=0,1, ..., M−1, L represents a number of discrete axial positions in the temporary image array such that j=0,1, ..., L−1, N represents a number of discrete axial positions in said probabilistically distributed sensor data such that n=0,1, ..., N−1, $P'_2[(m-i) \bmod M, n-j]$ represents a discrete two-dimensional PDF, $P'_{Az}[(m-i) \bmod M]$ represents a discrete one-dimensional azimuthal PDF, $P'_{Ax}[n-j]$ represents a discrete one-dimensional axial PDF, and notation $P'_2[(m-i) \bmod M, n-]$ and $P'_{Az}[(m-i) \bmod M]$ indicates that the two-dimensional and one-dimensional azimuthal PDFs are circular functions of the azimuth.

21. A system for estimating an azimuthal dependence of a parameter of a borehole using logging sensor measurements acquired as a function of azimuth of said logging sensors, the system comprising:
a downhole tool including at least one logging sensor and at least one azimuth sensor, data from the logging tool being operable to assist determination of a parameter of the borehole, the downhole tool further including a controller disposed to process logging sensor data with a predetermined sensor probability distribution function (PDF), the downhole tool operable to be coupled to a drill string and rotated in a borehole;
the controller configured to:
(A) cause the at least one logging sensor and the at least one azimuth sensor to acquire at least one data pair during each of predetermined first and second time periods, each of the data pairs comprising a logging sensor measurement and a corresponding azimuth;
(B) process the data pairs acquired in (A) with a predetermined sensor PDF to calculate sensor data that is probabilistically distributed in azimuth; and
(C) assign corresponding first and second borehole depth values to the probabilistically distributed sensor data determined in (B) using data pairs acquired during the first and second time periods.

22. The system of claim 21, wherein the sensor data is probabilistically distributed in (B) according to the following equation:

$$I_{FINAL}[m] = \sum_{i=0}^{M-1} I_{RAW}[i] \cdot P'_1[(m-i) \bmod M]$$

wherein M represents a number of discrete angular positions such that m=0,1, ..., M−1 and i=0,1, ..., M−1, $I_{RAW}[i]$ represents a temporary image array, $I_{FINAL}[m]$ represents said probabilistically distributed sensor data, $P'_1[(m-i) \bmod M]$ represents a discrete PDF, and the notation $P'_1[(m-i) \bmod M]$ indicates that the PDF is a circular function of the azimuth.

23. The method of claim 21, wherein the sensor data is probabilistically distributed in (B) according to at least one equation selected from the group consisting of:

$$I_{FINAL}[m,n] = \sum_{i=0}^{M-1}\sum_{j=0}^{L-1} I_{RAW}[i,j] \cdot P'_2[(m-i) \bmod M, n-j] \quad (i)$$

$$I_{FINAL}[m,n] = \sum_{i=0}^{M-1}\sum_{j=0}^{L-1} I_{RAW}[i,j] \cdot P'_{Az}[(m-i) \bmod M] \cdot P'_{Ax}[n-j] \quad (ii)$$

wherein $I_{RAW}[i,j]$ represents a one or two dimensional temporary image array, $I_{FINAL}[m,n]$ represents said probabilistically distributed sensor data, M represents a number of discrete angular positions such that m=0,1, ..., M−1 and i=0,1, ..., M−1, L represents a number of discrete axial positions in the temporary image array such that j=0,1, ..., L−1, N represents a number of discrete axial positions in said probabilistically distributed sensor data such that n=0,1, ..., N−1, $P'_2[(m-i) \bmod M, n-j]$ represents a discrete two-dimensional PDF, $P'_{Az}[(m-i) \bmod M]$ represents a discrete one-dimensional azimuthal PDF, $P'_{Ax}[n-j]$ represents a discrete one-dimensional axial PDF, and notation $P'_2[(m-i) \bmod M, n-j]$ and $P'_{Az}[(m-i) \bmod M]$ indicates that the two-dimensional and one-dimensional azimuthal PDFs are circular functions of the azimuth.

24. A method for estimating an azimuthal dependence of a parameter of a borehole using logging sensor measurements acquired as a function of sensor azimuth, the method comprising:
(a) rotating a downhole tool in a borehole, the tool including at least one logging sensor and at least one azimuth sensor, data from the logging sensor being operable to assist determination of a parameter of the borehole;
(b) causing the at least one logging sensor and the at least one azimuth sensor to acquire at least one data pair, each data pair comprising a logging sensor measurement and a corresponding azimuth, the at least one data pair stored in a one-dimensional temporary image array;
(c) multiplying the temporary image array acquired in (b) with a predetermined probability density function (PDF) to calculate sensor data that is probabilistically distributed in azimuth.

25. The method of claim 24, wherein the sensor data is probabilistically distributing in (c) according to the following equation:

$$I_{FINAL}[m] = \sum_{i=0}^{M-1} I_{RAW}[i] \cdot P'_1[(m-i) \bmod M]$$

wherein M represents a number of discrete angular positions such that m=0,1, ..., M−1 and i=0,1, ..., M−1, $I_{RAW}[i]$ represents the temporary image array, $I_{FINAL}[m]$ represents said probabilistically distributed sensor data, $P'_1[(m-i) \bmod M]$ represents a discrete PDF, and the notation $P'_1[(m-i) \bmod M]$ indicates that the PDF is a circular function of the azimuth.

26. The method of claim 25, wherein $P'_1[(m-i) \bmod M]$ is selected from the group consisting of:

$P'_{Az}[(m-i) \bmod M]$;

$P'_R[(m-i) \bmod M]$; and $P'_{Az}[(m-i) \bmod M] \cdot P'_R[(m-i) \bmod M]$;

wherein $P'_{Az}[(m-i) \bmod M]$ represents the response function of the logging sensor; $P'_R[(m-i) \bmod M]$ represents the response function of the azimuth sensor, and $P'_{Az}[(m-i) \bmod M] \cdot P'_R[(m-i) \bmod M]$ represents the product of the response function of the logging sensor with the response function of the azimuth sensor.

27. A method for estimating an azimuthal dependence of a parameter of a borehole using logging sensor measurements acquired as a function of sensor azimuth, the method comprising:

(a) rotating a downhole tool in a borehole, the tool including at least one logging sensor and at least one azimuth sensor, data from the logging sensor being operable to assist determination of a parameter of the borehole;

(b) causing the at least one logging sensor and the at least one azimuth sensor to acquire a plurality of data pairs during each of predetermined first and second time periods, each of the data pairs comprising a logging sensor measurement and a corresponding azimuth;

(c) processing the data pairs acquired in (b) with a predetermined probability density function (PDF) to calculate sensor data that is probabilistically distributed in azimuth, wherein the sensor data is probabilistically distributed in first and second, azimuthal and axial dimensions.

28. The method of claim 27, wherein the PDF is selected from the group consisting of: (i) a two-dimensional PDF and (ii) first and second one-dimensional PDFs.

29. The method of claim 27, wherein the sensor data is probabilistically distributed in (c) according to at least one equation selected from the group consisting of:

$$I_{FINAL}[m,n] = \sum_{i=0}^{M-1} \sum_{j=0}^{L-1} I_{RAW}[i,j] \cdot P'_2[(m-i) \bmod M, n-j] \quad (i)$$

$$I_{FINAL}[m,n] = \sum_{i=0}^{M-1} \sum_{j=0}^{L-1} I_{RAW}[i,j] \cdot P'_{Az}[(m-i) \bmod M] \cdot P'_{Ax}[n-j] \quad (ii)$$

wherein $I_{RAW}[i,j]$ represents a one- or two-dimensional temporary image array, $I_{FINAL}[m,n]$ represents said probabilistically distributed sensor data, M represents a number of discrete angular positions such that m=0,1, ..., M−1 and i=0,1, ..., M−1, L represents a number of discrete axial positions in the temporary image array such that j=0,1, ..., L−1, N represents a number of discrete axial positions in said probabilistically distributed sensor data such that n=0,1, ..., N−1, $P'_2[(m-i) \bmod M, n-j]$ represents a two-dimensional discrete PDF, $P'_{Az}[(m-i) \bmod M]$ represents a one dimensional azimuthal PDF, $P'_{Ax}[n-j]$ represents a one-dimensional axial PDF, and notation $P'_2[(m-i) \bmod M, n-j]$ and $P'_{Az}[(m-i) \bmod M]$ indicates that the two-dimensional and one-dimensional azimuthal PDFs are circular functions of the azimuth.

* * * * *